United States Patent Office 3,580,754
Patented May 25, 1971

3,580,754
PROCESS FOR PREPARATION OF PENTOLITE
Philip Barnhard IV, West Chester, Pa., assignor to E. I. du Pont de Nemours and Company, Wilmington, Del.
No Drawing. Filed May 1, 1969, Ser. No. 821,083
Int. Cl. C06b 3/00
U.S. Cl. 149—93                              7 Claims

ABSTRACT OF THE DISCLOSURE

Process for the preparation of stable pentolite from crude pentaerythritol tetranitrate comprising agitating in water a mixture of molten trinitrotoluene and crude pentaerythritol tetranitrate at a temperature above the melting point of the trinitrotoluene and below the melting point of the pentaerythritol tetranitrate, while maintaining the pH of the water in the range from 7 to about 10, followed by separating the pentolite from the aqueous phase.

BACKGROUND OF THE INVENTION

This invention relates to explosives and more particularly to a process for the preparation of stable pentolite from crude pentaerythritol tetranitrate.

Pentolite, meaning herein a mixture of from about 10 to 90 percent pentaerythritol tetranitrate (PETN) and from about 10 to 90 percent trinitrotoluene (TNT), is a high explosive especially useful where high brisance and ease of initiation are primary requisites, e.g., in primers.

Present aqueous methods for the preparation of pentolite necessitate the use of purified PETN. The reason is that when pentolite is prepared from crude PETN, meaning herein PETN containing about 0.2 to 15 percent nitric acid by weight, the nitric acid impurity makes the resulting pentolite unstable, causing its degradation on storage. Consequently, it has been the practice to purify crude PETN, e.g., by recrystallization from acetone, and to use the purified product in the preparation of stable pentolite, e.g., by mixing TNT and pure PETN in water. Since the separate purification step adds to the cost of the pentolite, it is readily seen that it would be desirable to eliminate this step and prepared stable pentolite directly from crude PETN.

SUMMARY OF THE INVENTION

In accordance with the present invention there is provided a process for the preparation of stable pentolite from crude PETN comprising agitating in water a mixture of about from 10 to 90, preferably 40 to 60, parts molten TNT and about from 10 to 90, preferably 40 to 60, parts crude PETN at a temperature above the melting point of the TNT (about 80° C.) and below the melting point of the PETN (about 138° C.), preferably at about from 85° to 100° C., while maintaining the pH of the water in the range of from 7 to about 10, preferably by the addition of alkaline earth carbonate, followed by separating the pentolite from the aqueous phase.

It has been discovered that when crude PETN contacts molten TNT as in the above process, most of the HNO$_3$ initially occluded in the PETN is liberated and can be neutralized with base. Thus, neutralization can take place simultaneously with formation of the pentolite. In the absence of the molten TNT, the HNO$_3$ impurity remains occluded in the crude PETN, hence cannot be neutralized in the same manner.

DESCRIPTION OF PREFERRED EMBODIMENTS

The pentolite made by the process of the instant invention comprises about from 10 to 90 parts TNT and about from 10 to 90 parts PETN. The preferred composition comprises about from 40 to 60 parts TNT and about from 40 to 60 parts PETN, an equal weight ratio of TNT to PETN being especially preferred.

The TNT used can be in any available form, e.g., flaked, pelleted, grained or cast. The crude, PETN, which is used in the present process, should be particulate and is normally available in water-wet form containing, by weight, about from 5 to 30 percent water. While the crude PETN which can be used in this invention contains, by weight, about from 0.2 to 15 percent HNO$_3$, the crude PETN normally available contains about from 0.2 to 3 percent HNO$_3$. To achieve the desired stability of the pentolite, the HNO$_3$ content of the crude PETN preferably will be reduced to below about 0.1 percent by weight of the PETN.

The order in which the TNT, PETN, water and base are combined is not critical. Normally, the TNT will be added to water and the mixture heated to above the melting point of the TNT. While the temperature of the TNT is maintained above its melting point but below the melting point of the crude PETN, preferably at about from 85° to 100° C., the crude PETN, preferably in water-wet form, is added, with agitation, together with base, either initially or incrementally, to maintain the pH of water in the range of from 7 to about 10. The amount of water is not critical, its primary function being to remove the HNO$_3$ base neutralization product. For best results, the water should be at least about 10 percent by weight of the crude PETN.

Any base which is inert with respect to the explosives and which will maintain the pH of the water in the range of from 7 to about 10, e.g., water insoluble, slightly soluble and weak bases, are suitable for use in this invention. The pH should not rise above about 10 as PETN is unstable in high pH mediums.

For example, Groups II, III and VIII metal oxides, hydroxides and carbonates and mixtures thereof which will not cause the pH of the water to rise above about 10 can be used. Representative examples include magnesium carbonate, calcium carbonate, calcium magnesium carbonate, strontium carbonate, barium carbonate, zinc oxide, zinc hydroxide, zinc carbonate, ferrous hydroxide, ferrous carbonate, nickelous hydroxide, nickelous carbonate, and aluminum trihydroxide. The alkaline earth carbonates, e.g., magnesium carbonate, calcium carbonate, calcium magnesium carbonate, strontium carbonate, barium carbonate, and mixtures thereof, are preferred and especially preferred is calcium carbonate.

The base neutralizes the HNO$_3$ impurity initially occluded in the crude PETN, as it is liberated. Thus, the amount of base added should be at least about enough so that the equivalents of base equal the equivalents of HNO$_3$ present in the crude PETN, equivalent of base being defined as the equivalent weight of the base or the weight that will react with an equivalent weight of acid, and equivalent of HNO$_3$ being the equivalent weight of HNO$_3$ or 63 grams atomic weights. Excess base is not harmful to the success of the process as long as the pH does not rise above about 10. In fact, excess base is preferred in that its presence in the pentolite enhances the long term stability of the pentolite. Normally, there will not be any advantage in having more than about two percent excess base by weight based on the weight of the pentolite.

After agitating the mixture to ensure neutralization of the HNO$_3$ (generally, no more than about one minute is necessary), the aqueous phase, containing the nitrate salt neutralization product, is removed. If grained pentolite is desired, cold water can be added with stirring before removal of the aqueous phase to cool the mixture below the melting point of the TNT, i.e., below about 80° C., which grains the pentolite. If it is desired to cast the pentolite, the aqueous phase can be removed while the TNT is still molten, followed by casting. Removal of the aqueous phase can be accomplished by any conventional means, e.g., decantation, filtration of the pentolite, etc.

The following examples serve to further illustrate the process of this invention. In the examples, parts and percentages are by weight. In the examples, the base added maintains the pH of the water between 7 and about 10.

EXAMPLE 1

50 parts of TNT and 60 parts of water are heated in a vessel until the TNT is melted. While stirring, 532 parts of crude PETN, containing 0.23 percent $HNO_3$, and 1 part calcium carbonate are added, and the stirring is continued for one minute. 60 parts of cold water are then added to grain the pentolite, followed by decantation of the aqueous phase. The resulting pentolite contains no detectable $HNO_3$.

EXAMPLE 2

The procedure of Example 1 is repeated using 2 parts TNT, 1.04 parts initial water, 2.33 parts water-wet crude PETN, containing 11.9 percent water and 2.5 percent $HNO_3$, and 0.11 part calcium carbonate, with 1 part cold water to grain the product. The resulting pentolite contains 0.08 percent $HNO_3$.

EXAMPLE 3

Example 2 is repeated using 2.08 parts initial water and instead of graining the product with cold water, the aqueous phase is decanted and the molten product cast. The resulting pentolite contains 0.08 percent $HNO_3$.

EXAMPLE 4

Example 3 is repeated using 3.2 parts TNT, 4.16 parts initial water, 1.02 parts of the water-wet crude PETN and 0.04 part calcium carbonate. The cast product has less than 0.01 percent $HNO_3$.

EXAMPLE 5

Example 3 is repeated using 3.6 parts TNT, 2.08 parts initial water, 0.51 part of the water-wet crude PETN and 0.02 part calcium carbonate. The cast pentolite has less than 0.01 percent $HNO_3$.

What is claimed is:

1. A process for the preparation of stable pentolite from crude pentaerythritol tetranitrate comprising agitating in water a mixture of about from 10 to 90 parts molten trinitrotoluene and about from 10 to 90 parts crude pentaerythritol tetranitrate at a temperature above the melting point of the trinitrotoluene and below the melting point of the pentaerythritol tetranitrate while maintaining the pH of the water in the range of from 7 to about 10, followed by separating the pentolite from the aqueous phase.

2. A process of claim 1 wherein said mixture comprises about from 40 to 60 parts molten trinitrotoluene and about from 40 to 60 parts pentaerythritol tetranitrate.

3. A process of claim 2 wherein the pH of the water is maintained in the range of from 7 to about 10 by the addition of alkaline earth carbonate.

4. A process of claim 3 wherein said alkaline earth carbonate is calcium carbonate.

5. A process of claim 4 wherein said trinitrotoluene and said pentaerythritol tetranitrate are combined in about an equal weight ratio.

6. A process of claim 5 wherein said temperature is about from 85 to 100° C.

7. A process of claim 6 wherein said alkaline earth carbonate is added in an amount such that the equivalents of alkaline earth carbonate are greater than the equivalents of $NHO_3$ present in said crude pentaerythritol tetranitrate.

References Cited

UNITED STATES PATENTS

| | | | |
|---|---|---|---|
| 2,346,116 | 4/1944 | Snelling | 149—93 |
| 2,371,879 | 3/1945 | Davis et al. | 149—93 |
| 2,384,730 | 9/1945 | Davis et al. | 149—93X |
| 3,356,548 | 12/1967 | Berthmann et al. | 149—93X |
| 3,357,873 | 12/1967 | Berthmann et al. | 149—93X |

BENJAMIN R. PADGETT, Primary Examiner

S. J. LECHERT, JR., Assistant Examiner

U.S. CL. X.R.

149—105